United States Patent
Hirth et al.

(10) Patent No.: US 7,841,516 B2
(45) Date of Patent: Nov. 30, 2010

(54) DELIVERY DATA OBJECTS IN ENTERPRISE COMPUTING SYSTEMS

(75) Inventors: Jochen Hirth, Birkeuau (DE); Ami Heitner, Kfar-Sava (IL); Stephan Hetzer, Ostringen (DE); Renzo Colle, Rastatt (DE)

(73) Assignee: SAP AG, Walldorf (DE)

( * ) Notice: Subject to any disclaimer, the term of this patent is extended or adjusted under 35 U.S.C. 154(b) by 987 days.

(21) Appl. No.: 11/320,913

(22) Filed: Dec. 30, 2005

(65) Prior Publication Data

US 2007/0152044 A1 Jul. 5, 2007

(51) Int. Cl.
*G06K 5/00* (2006.01)
(52) U.S. Cl. ........................................ 235/380; 235/376
(58) Field of Classification Search ................. 235/380, 235/376; 705/7, 8, 10
See application file for complete search history.

(56) References Cited

U.S. PATENT DOCUMENTS

| | | | | |
|---|---|---|---|---|
| 6,055,519 | A * | 4/2000 | Kennedy et al. ............... | 705/80 |
| 6,801,818 | B2 * | 10/2004 | Kopcha ........................ | 700/97 |
| 7,191,142 | B1 | 3/2007 | Sandell et al. | |
| RE40,924 | E | 9/2009 | Nicholls et al. | |
| 2002/0007293 | A1 * | 1/2002 | Clemens et al. ................ | 705/7 |
| 2002/0059110 | A1 | 5/2002 | Yamamoto et al. | |
| 2002/0069096 | A1 * | 6/2002 | Lindoerfer et al. ............. | 705/7 |
| 2002/0138358 | A1 * | 9/2002 | Scheer ........................ | 705/26 |
| 2002/0156642 | A1 | 10/2002 | Aida | |
| 2003/0004839 | A1 | 1/2003 | Lin et al. | |
| 2003/0208418 | A1 * | 11/2003 | Caputo et al. .................. | 705/28 |
| 2004/0243487 | A1 | 12/2004 | Tien et al. | |
| 2005/0015288 | A1 | 1/2005 | Reeves et al. | |
| 2005/0015314 | A1 | 1/2005 | Stephan | |

OTHER PUBLICATIONS

"Non-Final Office Action" mailed Nov. 9, 2009, for U.S. Appl. No. 11/320,569, entitled "Controlling Logistics Execution Across Computer Applications" filed Dec. 30, 2005. 12pgs.
"Evolving to a Business Process Platform with SAP ERP: Unleash the Power of Enterprise SOA to Gain Competitive Advantage", Copyright 2008 by SAP AG, 7 pgs. May 31, 2006.
"Final Office Action" mailed Jul. 8, 2010, for U.S. Appl. No. 11/320,912, entitled "Controlling Logistics Execution in a Computer Application" filed Dec. 30, 2005. 15pgs. Jul. 8, 2010.

* cited by examiner

*Primary Examiner*—Ahshik Kim
(74) *Attorney, Agent, or Firm*—Buckley, Maschoff & Talwalkar LLC

(57) ABSTRACT

A method for managing a supply chain for a business enterprise in a manner that is applicable to many different business enterprises and a computer program product for performing the method are provided. The method includes creating a planning-delivery data object for use in documenting planned delivery of goods or services related to a business transaction. The method also includes creating a shipping-delivery data object for use in documenting shipment of at least some of the goods or services related to the business transaction. The method further includes confirmed-delivery data object for use in documenting receipt of at least some of the goods or services by a product recipient. The planning-delivery data object, the shipping-delivery data object, and the confirmed-delivery data object correspond to one another.

18 Claims, 12 Drawing Sheets

DELIVERY DATA OBJECTS IN ENTERPRISE COMPUTING SYSTEMS

TECHNICAL FIELD

This description relates to techniques for controlling transaction processing related to supply chain management that is performed by computer systems.

BACKGROUND

Computer systems often are used to manage and process business data. To do so, a business enterprise may use various application programs running on one or more computer systems. Application programs may be used to process business transactions, such as taking and fulfilling customer orders, providing supply chain management, performing human resource management functions, and performing financial management functions. In many cases, application programs used by a business enterprise are developed by a commercial software developer for sale to, and use by, many business enterprises.

Applications for supply chain management may be used to process business transactions related to planning and executing operations in a supply chain of business enterprises for the purpose of satisfying customer requirements. In one example, a supply chain may involve a manufacturer or distributor that supplies goods to another business enterprise, which, in turn, sells and delivers goods to a consumer of the goods, who may be another business enterprise or a natural person. Supply chain management may be complex and may involve, for example, demand and supply planning, service parts planning, procurement, manufacturing, warehousing, order fulfillment and transportation. The processing of information related to movement and placement of goods may be referred to as logistics and may be considered an aspect of supply chain management.

SUMMARY

In one general aspect, techniques are provided for managing a supply chain for a business enterprise in a manner that is applicable to many different business enterprises. A planning-delivery data object is created for use in documenting planned delivery of goods or services related to a business transaction. A shipping-delivery data object is created for use in documenting shipment of at least some of the goods or services related to the business transaction. A confirmed-delivery data object is created for use in documenting receipt of at least some of the goods or services by a product recipient. The planning-delivery data object, the shipping-delivery data object, and the confirmed-delivery data object correspond to one another.

Implementations may include one or more of the following features. For example, the planning-delivery data object may include attributes identifying the goods or services to be provided through the business transaction. The shipping-delivery data object may include attributes identifying goods shipped from a logistics location to the product recipient, and the attributes may include a product-identifier attribute and a product-quantity attribute. The shipping-delivery data object may include an attribute identifying materials used to ship at least some of the goods from the logistics location to the product recipient. The confirmed-delivery data object may include attributes identifying goods received by the product recipient, and the attributes may include a product-identifier attribute and a product-quantity attribute.

An attribute of the shipping-delivery data object may be the same attribute as an attribute of the confirmed-delivery data object, and a data value of the attributes of the shipping-delivery data object may be different from the data value of the attribute of the confirmed-delivery data object.

The business transaction may involve outbound delivery of goods from a logistics location to the product recipient, and the planning-delivery data object, the shipping-delivery data object, and the confirmed-delivery data object may document aspects of shipment of the goods from the logistics location to the product recipient. The business transaction may involve inbound delivery of goods from a product supplier to a logistics location, and the planning-delivery data object, the shipping-delivery data object, and the confirmed-delivery data object may document aspects of shipment of the goods from the product supplier to the logistics location.

Implementations of any of the techniques described above may include a method or process, an apparatus or system, or computer software on a computer-accessible medium. The details of particular implementations are set forth in the accompanying drawings and description below. Other features will be apparent from the following description, including the drawings, and the claims.

DESCRIPTION OF DRAWINGS

Like reference symbols in the various drawings indicate like elements.

DETAILED DESCRIPTION

Figure 1:
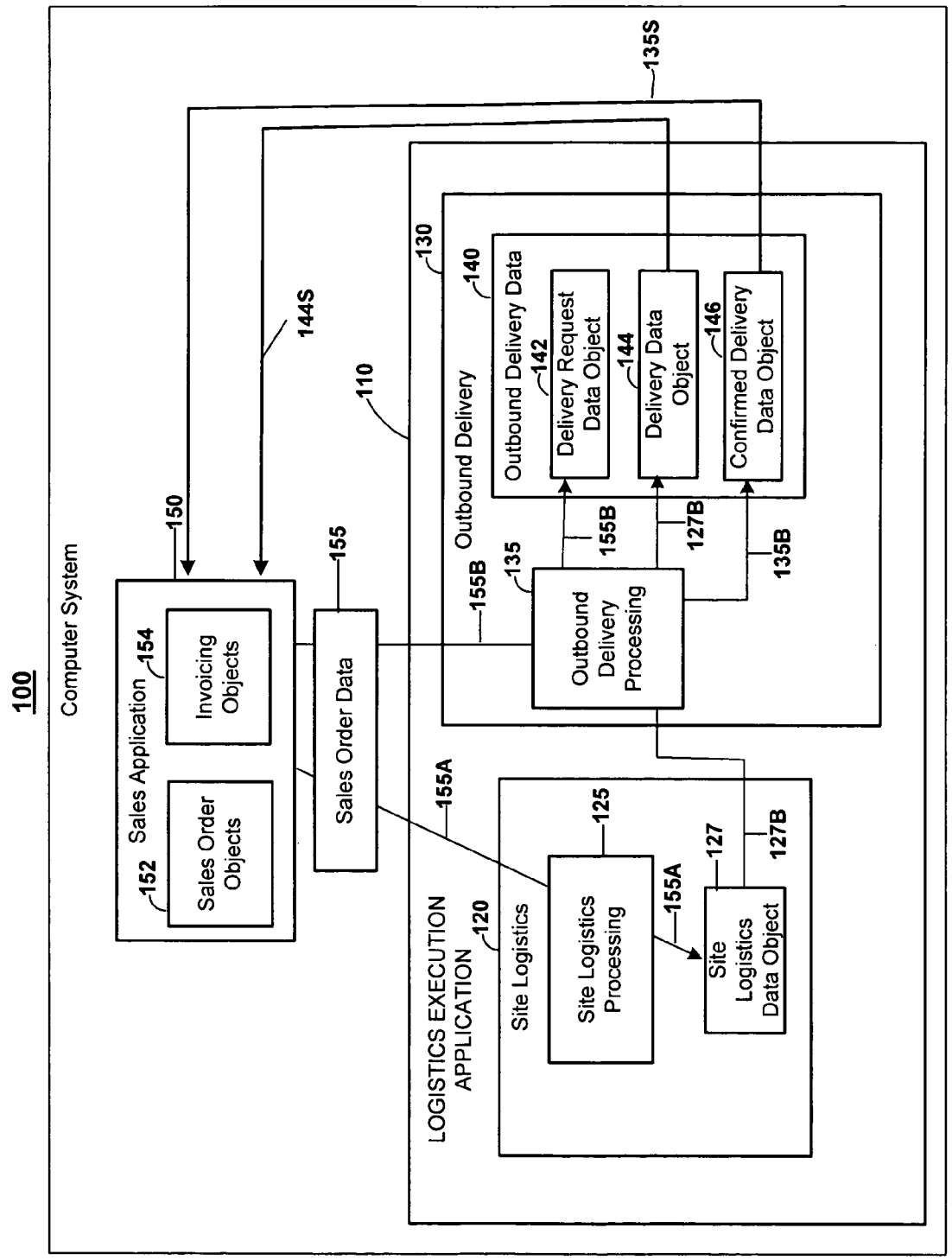
FIG. 1 is a block diagram of an outbound delivery system.

A computer system 100, shown in FIG. 1, includes a logistics execution application 110. In general, the logistics execution application 110 performs functions related to logistics execution and includes one or more computer application programs (e.g., software) executing on the computer system 100. The logistics execution application 110 may be a commercial computer application that is developed and licensed (or sold) by a commercial software developer that is different from a business entity that uses the logistics execution application. The logistics execution application 110 may be part of a suite of commercial computer applications that is developed and licensed (or sold) by a commercial software developer for use by multiple, different business entities. For example, a commercial software developer may sell, in addition to a logistics execution application 110, another type of computer application that supports different business functions, such as additional supply chain management functions, a customer relationship management or sales system, a financial management system, or a human resources management system.

The supply chain management application may work in conjunction with one or more other types of computer applications to form an integrated enterprise information technology (IT) solution for a business enterprise, which also may be referred to as an enterprise IT system.

The logistics execution application 110 includes functions to control and document logistics operations related to the movement and placement of goods ("logistics") performed by a logistic location or site, such as a factory, a warehouse, a distribution center, or a logical component thereof. In one example, operations relating to logistics execution may include inventory management at a logistics site. In another example, operations relating to logistics execution also may include operations related to packaging goods for delivery and arranging for transportation of goods to a customer. Such operations may include picking goods from a warehouse location (e.g., a shelf), packing goods for delivery, and loading a truck with the goods packaged for delivery (or otherwise delivering the package for transportation). In a further example, operations relating to logistics execution may include internal movement of goods from one part of a warehouse to another part of the warehouse.

The logistics execution application 110 includes a site logistics component 120 and an outbound delivery component 130. As such, the logistics execution application 110 separates operations related to logistics execution at a logistics site from documentation of delivery processing to enable supply chain management.

More particularly, the site logistics component 120 includes instructions 125 for site logistics processing. In general, site logistics processing is related to operations at a logistics location or site (such as a factory, a warehouse a distribution center or a collection thereof). As such, site logistics processing generally represents an internal view of operations related to the logistics site. When executed by a processor or processors of the computer system 100 on which the logistics execution application is operating, the instructions 125 perform operations related to logistics execution at a logistics site. The site logistics instructions 125 include, for example, instructions for creating or revising orders (or another type of task instruction to initiate or otherwise guide) for logistic execution activities or receive indications of logistic executions activities that have been partially or fully performed or cancelled. Examples of logistic execution activities include picking goods from a warehouse location, packing goods for delivery, loading a truck with the packages for delivery, moving goods from one location in a warehouse to another location in the warehouse, and stocking goods that have been received in the warehouse. For convenience, the execution of instructions 125 that causes the computer system 100 to perform some operation may be described as having the site logistics component 125 perform the operation.

The logistics execution application 110 also includes an outbound delivery component 130 that performs operations related to outbound delivery processing. In general, outbound delivery processing is related to delivery operations and, as such, generally represents an external view in that it may focus on communicating with, and information relevant to, a product recipient. An outbound delivery is a delivery that is sent from the business enterprise, such as when the business enterprise ships goods to a product recipient. The packaging and shipment of the goods to a customer may be referred to as an outbound delivery. In contrast to an outbound delivery, when the business enterprise receives goods, the ordering, receipt and storage of goods may be referred to as an inbound delivery—that is, an inbound delivery is a delivery that is received.

More particularly, the outbound delivery component 130 includes instructions 135 for documenting delivery processing related to logistic execution activities. The outbound delivery component 130 also includes outbound delivery data 140 having delivery request data objects 142, delivery data objects 144 and confirmed delivery data objects 146 to document (or otherwise memorialize) an aspect of delivery related to a business transaction. In the example of FIG. 1, the outbound delivery component 130 stores outbound delivery data 140 as one of three predefined "object types," wherein a given object type may contain one or more predefined "database objects." Within a particular predefined object type, there may be certain specific database objects, and within the database objects, there may be attributes and corresponding attribute values that form the object.

Outbound delivery data 140 may be stored in an object-oriented database system that logically or physically organizes data into a series of objects (which may be referred to as an object-oriented database), a relational database, or another type of data management system. Additionally or alternatively, outbound delivery data 140 may be stored in a relational database management system that may logically organize data into a series of database tables and may not necessarily organize the outbound delivery data into objects. A database table may arrange data associated with an entity or a transaction in a series of columns and rows. Each column may describe an attribute of the entity or transaction for which data is being stored. Each row may represent a collection of attribute values for a particular entity or a particular transaction. Some implementations may use a relational database system to store outbound delivery data as objects. Data may be stored physically in one or more relational database tables and organized logically as a series of objects. Typically, a relational database table may be used to store data belonging to a particular type of object—that is, an object type includes attributes that are included in other objects of the particular object type. Each row in the relational database table generally represents an object having attribute values corresponding to attributes for the particular object type.

In another example, outbound delivery data 140 may be stored in a type of data management system that may not use a relational or object database. For example, a series of XML (Extensible Mark-up Language) documents may be used or a series of hypertext markup language (HTML) documents may be used.

An object in delivery request data objects 142 serves to document (or otherwise memorialize) a delivery request that is to be fulfilled by a business enterprise. Typically, the business enterprise is a vendor (such as a manufacturer, a distributor, or a retail organization) that provides goods or services to a customer or transportation service. A business entity, organization, or natural person who receives a good or service may be referred to as a customer, a product recipient or a service recipient (collectively, "a product recipient"). One example of a delivery request is a special view of sales order data, where the delivery request includes the goods ordered and logistics relevant information to prepare the goods for delivery. In some implementations, an outbound delivery request object may include all, or a substantial majority, of logistics data from the initiating object or document of an outbound delivery process (such as a sales order).

An object in delivery data objects 144 serves to document (or otherwise memorialize) a composition of goods that is provided for shipping by the business enterprise (e.g., vendor). For example, a delivery data object may document goods that are packaged in one or more boxes (or another type of shipping container) to be delivered to a transportation service for shipping to a product recipient. A delivery data object may document packaging materials used to ship goods to a product recipient. In some implementations, a delivery note (e.g., a printed document that identifies the goods shipped in a particular container or group of containers) may be produced based on a delivery data object.

An object in confirmed delivery data objects 146 identifies goods that have been received by a product recipient. Typically, a particular business transaction (such as a particular sales order) corresponds to a delivery request data object, one or more delivery data objects and one or more confirmed delivery data objects, as such, the delivery request data object, one or more delivery data objects and one or more confirmed delivery data objects serve to document or memorialize logistic activities involved in the particular business transaction.

The computer system 100 also includes a sales application 150 that may be used by a sales person or other type of user to create and revise sales order documents or objects 152. The sales application 150 may be, for example, a call center software application in which a sales agent enters a sales order while talking to a customer on a telephone. Another example of a sales application 150 is a customer relationship management (CRM) application. The sales application 150 also includes invoicing objects 154 related to sales orders.

The sales application 150 provides, to the site logistics component 120, sales order data 155 which represents all of, or portions of, sales order objects 152 (as indicated by flow 155A). The sales application 150 also provides sales order data 155 to the outbound delivery component 130 (as indicated by flow 155B). The sales application 150 need not necessarily provide, in separate data transfer operations, sales order data 155 to the components 120 or 130 of the logistics execution application 110. In some implementations, the logistics execution application 110 may receive the sales order data 155, and then may make the data, or portions of the data, available to each of the site logistics component 120 and the outbound delivery component 130. Alternatively or additionally, the logistics execution application 110 may access sales order data 155 or sales order objects 152.

In any case, the outbound delivery component 130 processes the sales order data 155 to generate and store delivery request data objects 142 corresponding to the sales order data 155 (also as indicated by flow 155B). In some implementations, a copy of the sales order data 155 is stored as delivery request data objects 142. Alternatively or additionally, the sales order data 155 may be processed to generate additional or substitute data that is stored in a delivery request data object for a particular sales order. A delivery request object serves to document (or otherwise memorialize) a corresponding sales order.

The site logistics component 120 processes the sales order data 155 to generate and store site logistics data objects 127 that are used to initiate, guide or otherwise control logistics execution operations related to performing logistics to accomplish business transactions related to the sales orders (also as indicated by flow 155A). For example, an object in site logistics data objects 127 may correspond to one or more of picking, packing and loading a delivery container (such as a box) with ordered goods.

The site logistics component 120 also sends site logistics data objects 127 to the outbound delivery component 130, which, in turn, generates and stores delivery data objects 144 (as indicated by flow 127B). A delivery data object serves to document (or otherwise memorialize) a corresponding logistics execution order.

The outbound delivery component 130 also generates and stores confirmed delivery data objects 146, based on confirmation of actual delivery of a delivery container or multiple delivery containers (as indicated by flow 135B). For example, a transportation service may provide delivery confirmation of a delivery shipped through the transportation service. The delivery confirmation may be provided to the logistics execution application 110 programmatically through an interface to a computer system associated with the transportation service. Alternatively or additionally, the logistics execution application 110 may receive delivery confirmation through user-input. The outbound delivery component 130 provides delivery confirmation to the sales application 150, which generates and stores invoicing objects corresponding to the confirmed delivery objects (as indicated by flow 135S). In some implementations, the outbound delivery component 130 may provide the delivery composition of goods to the sales application 150, which may generate and store data objects corresponding to the delivery data objects (as indicated by flow 144S).

In some implementations, either or both of the logistics execution application 110 and the sales application 150 may operate on multiple computer systems. The logistics execution application 110 and the sales application 150 may be logically decoupled and/or physically decoupled. Logical decoupling refers to the fact that knowledge needed to use logistics execution application 110 and the sales application 150 is related to different topics, so it is likely that a user of the logistics execution application 110 does not have the ability to use the sales application 150, and vice versa. Physical decoupling means that the logistics execution application 110 and the sales application 150 are physically separated. Thus, when physically decoupled, each of the logistics execution application 110 and the sales application 150 may be located on separate computer systems, including computer systems that are in distinct locations. When the logistics execution application 110 and the sales application 150 are physically decoupled, some means for communication between the computer system on which the logistics execution application 110 resides and the computer system on which the sales application 150 resides is necessary. Communication may be provided, for example, through a variety of established networks, such as, for example, the Internet, a Public Switched Telephone Network (PSTN), the Worldwide Web (WWW), a wide-area network ("WAN"), a local area network ("LAN"), a wired network, or a wireless network. The communication also may be provided through the use of a middleware messaging system, in which messages containing enterprise application data are asynchronously transferred from the sales application 150 and eventually to the logistics execution application 110. The messages may be exchanged using a messaging system (that is, middleware) using store-and-forward message transfer.

In some implementations, system 100 may be implemented using a web services architecture. For example, each of the site logistics component 120 and the outbound delivery component 130 may be implemented as a web service.

The system 100 may be used, for example, in delivery of goods from a warehouse or distribution center to a transportation service that transports goods to a customer. The transportation service may be operated by the same business entity that operates the warehouse or distribution center, thought this need not necessarily be so. The delivery confirmation may come from the transportation service or the customer, or both. In another example, goods may be delivered from a factory to a warehouse or distribution center. In some implementations, the delivered goods may be industrial goods, such as chemicals (some of which may be hazardous), industrial equipment and construction equipment. The delivered goods may be consumer goods, including, for example, automobiles that are delivered to an automotive distribution center or retail dealership.

In general, separation of operations related to logistics execution at a logistics site from documentation of delivery processing helps to improve in-process visibility of a business transaction and helps to improve communication with parties involved in a business transaction, including product recipients. Because separate data objects are generated and stored for a delivery request data object, a delivery data object, and a confirmed delivery data object, business transaction information is not lost as the business transaction is fulfilled and/or aspects of the business transaction are changed. As such, a difference between goods ordered (as represented by a delivery request data object), goods packaged for transportation (as represented by a delivery data object), and goods delivered (as represented by a confirmed delivery data object) can be detected. In addition, separation of logistics execution from documentation of logistics execution may help to improve the modeling of the logistics execution process within different software components. For example, because physical execution processes are not triggered by delivery objects, physical execution processes are independent, or decoupled, from delivery processes. This separation allows flexible support for physical execution processes. In one example of such flexible support, a delivery note documenting a shipment may be created independently of a sales order. This may be useful, for example, in the case of direct shipping from a production line. In that case, shipping need not necessarily be controlled by a particular sales order or even multiple sales orders. For example, goods may be shipped (and a delivery note is created) when a shipping vehicle is filled with goods that are shipped directly from a production line.

Figure 6:
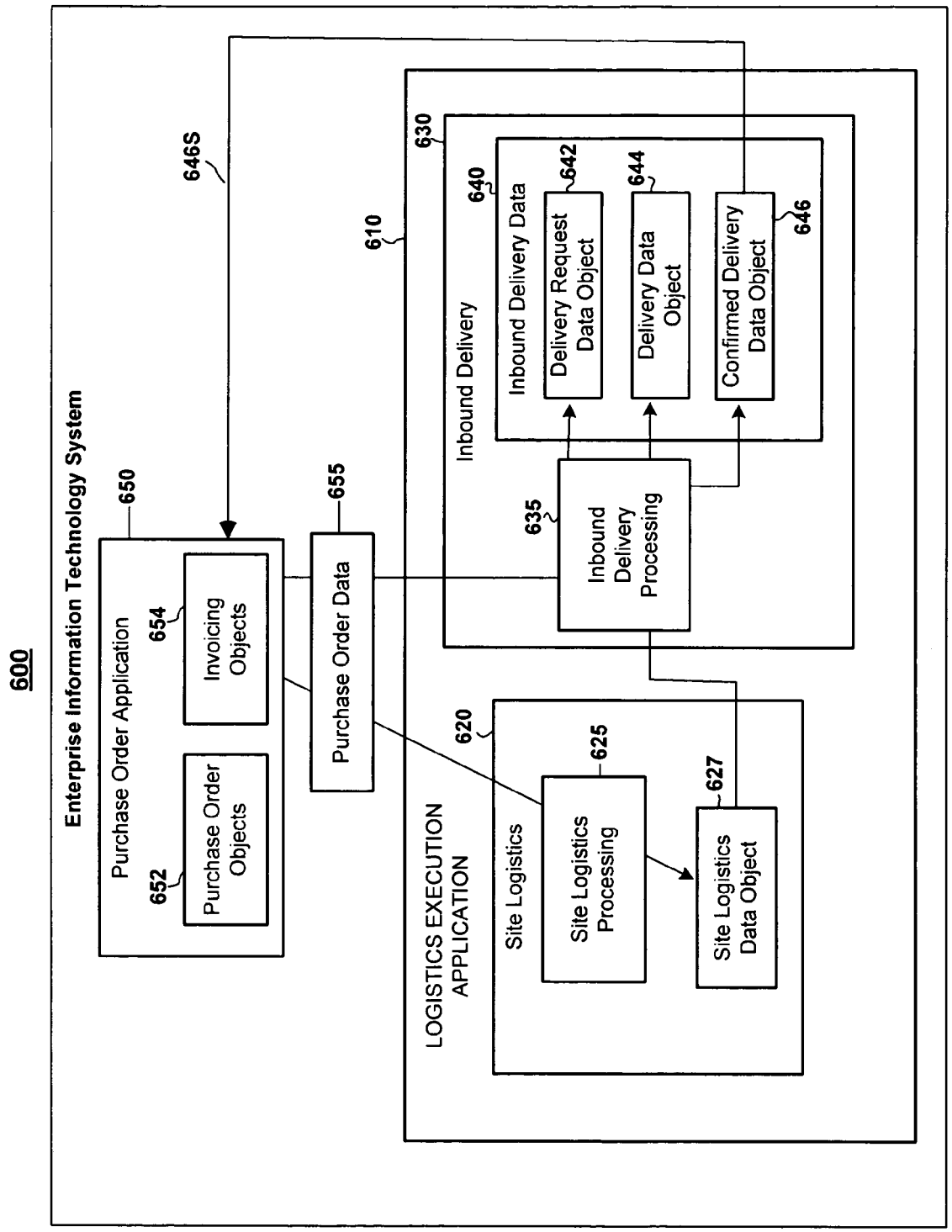
FIG. 6 is a block diagram of an inbound delivery system.

Similar techniques may be applied to inbound delivery processing, as described more fully with respect to FIG. 6.

Figure 2:
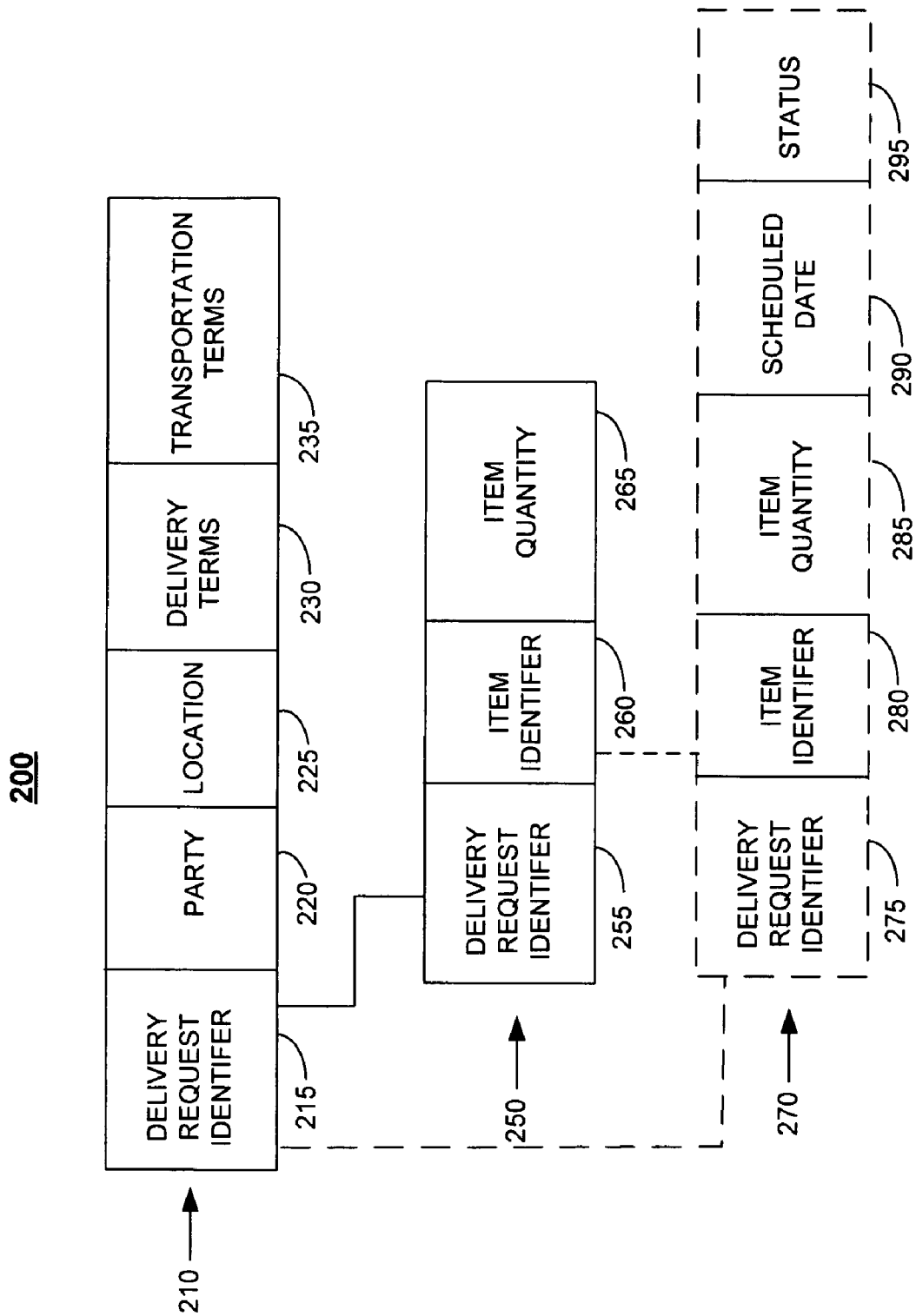
FIGS. 2 and 3 are block diagrams illustrating example data structures used by the system of FIG. 1.

FIG. 2 shows a data structure 200 that may be an implementation of a delivery request data object 142 in FIG. 1. The data structure 200 includes a root 210 and an item node 250. Optionally, the data structure 200 may include an item schedule 270.

A root node 210 includes a delivery request identifier 215, a party 220, a location 225, delivery terms 230, and transportation terms 235. The delivery request identifier 215 is a unique identifier or a sales order identifier that includes information specifying the delivery request to which the data structure corresponds. The party 220 includes the name, title, or other identifying information of the delivery recipient. The delivery recipient may be a customer, a transportation service or another party involved in the delivery. The location 225 includes the destination of the product requested. The identified location generally is the final destination of the delivery to the delivery recipient, though need not necessarily be so. For example, the identified location may be an intermediate location, such as a transportation site. The delivery terms 230 includes instructions as to how the product is to be delivered. For example, delivery terms 230 may specify customer-driven delivery constraints. For example, the delivery terms may specify delivery priority or the number of partial deliveries allowed, such as requiring that all products be shipped in a single shipment or allowing two shipments of the products to be shipped. The delivery priority may help to identify a delivery to an important customer or a delivery that is to be expedited. The delivery terms 230 also may indicate permitted deviations regarding quantity of goods to be shipped or permitted deviations from a requested delivery date.

The transportation terms 235 include instructions, such as transportation channel, means or method to be used (such as rail, ground or air transport) to ship the product An item node 250 includes a delivery request identifier 255, an item identifier 260, and an item quantity 265. The delivery request identifier 255 includes information specifying the delivery request to which the item corresponds, and generally matches or corresponds to the delivery request identifiers 215 of a root node 210. The item identifier 260 includes information as to the identity of the item. The item quantity 265 includes the quantity of a product that is requested for delivery. For example, the quantity of a product may correspond to the quantity ordered of products as packaged. When multiple items are sold as a group (e.g., multiple pencils are sold in a box of pencils), the quantity of product may reflect the number of groups (e.g., pencil boxes) to be shipped, rather than the number of items (e.g., pencils).

The data structure 200 may include multiple item nodes 250. For example, a first item node may identify a first item identifier 260 and an item quantity 265 to be supplied of a product that corresponds to the first item identifier 260. A second item node may identify a second item identifier 260 and an item quantity 265 to be supplied of a product that corresponds to the second item identifier 260.

The item schedule 270 is optional and is associated with a subset of items in the delivery request. The item schedule 270 may be included when, for example, a part of the request is on backorder or when differing delivery dates are requested for different parts of the delivery request. Included within the item schedule 270 is a delivery request identifier 275, an item identifier 280, an item quantity 285, a scheduled date 290, and a status 295. The delivery request identifier 275 includes information specifying the delivery request to which the item schedule 270 corresponds, and generally matches or corresponds to the delivery request identifier 215 of a root node 210. The item identifier 280 includes information as to the identity of item, and may match the item identifier 260 of an item node 250. The item quantity 285 includes the quantity of a product that is requested for delivery. The scheduled date 290 includes the time or place in a sequence of events in which the delivery is to occur. The status 295 includes the current state or status of the product that is requested.

For brevity, the contents of the root 210, item nodes 250, and item schedule 270 were stated to be data as described above. In different implementations, any of the sets of data could be pointers to the location of the data described above.

The items detailed above may be hierarchical in that a product request for one item may result in a request for a group of other items associated with the product request and vice-versa. For example, an order for a piece of industrial equipment may result in identification of multiple individual items that are separately picked, packaged, and shipped.

The data structure 200 may include other information not detailed above. For example, the data structure 200 may include other data associated with goods or services including party, delivery terms, or transportation.

Figure 3:
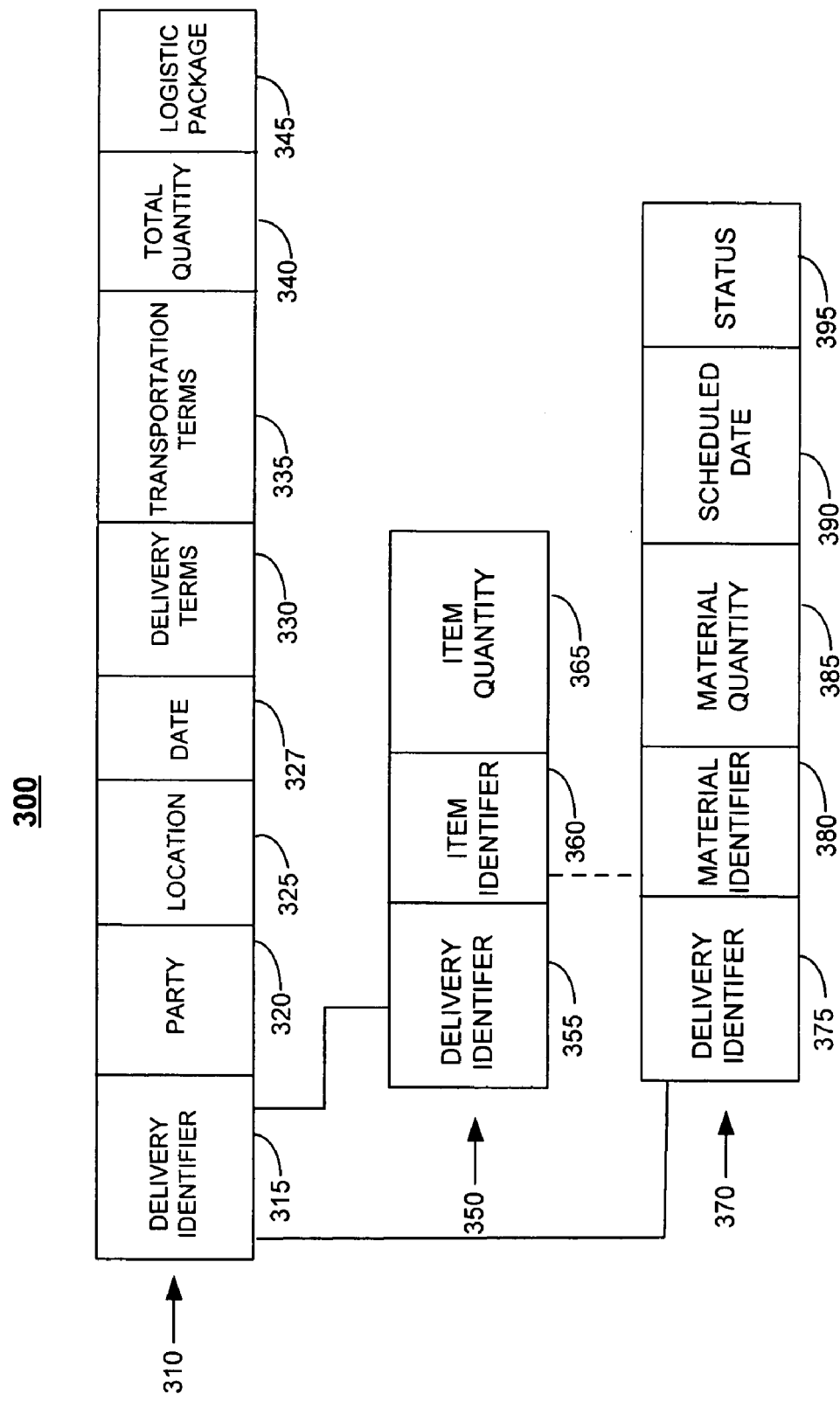

FIG. 3 shows a data structure 300 that may be an implementation of a delivery data object 144 in FIG. 1. The data structure 300 includes a root 310, item nodes 250, and material nodes 370. In some implementations, the data structure 300 for a delivery data object may be substantially similar to, or otherwise include many of the same attributes of, the data structure 200 for a delivery request object. In the illustration of FIG. 3, the data structure 300 of the delivery data object includes a root node 310 including the attributes of the data structure 200 of the delivery request data object shown in FIG. 2. In contrast with the data structure 200 of the delivery request data object shown in FIG. 2, however, the data structure 300 for a delivery data object includes attributes 340 and 345 and a material node 370 (rather than item schedule 270 of FIG. 2), as described more fully below.

More particularly, a root node 310 includes a delivery identifier 315, a party 320, a location 325, a date 327, delivery terms 330, transportation terms 335, a total quantity 340, and a logistic package 345. The delivery identifier 315 is a unique identifier or sales order identifier that includes information specifying the delivery request to which the data structure corresponds. This enables identification of a particular delivery object as corresponding to a particular delivery request object. Other techniques may be used to identify a correspondence between a delivery object and a delivery request object. The party 320 includes the name, title, or other identifying information of the delivery recipient. The delivery recipient may be a customer, a transportation service or another party involved in the delivery. The location 325 includes the destination of the product requested. The date 327 includes information associated with the time at which the delivery is to be made. For example, the date 327 can include the anticipated or requested time of delivery. The delivery terms 330 include instructions as to how the product is to be delivered. For example, delivery terms 330 may specify the customer-driven delivery constraints, such as a delivery priority, number of partial deliveries allowed, permitted deviations regarding ordered quantity, or permitted deviations regarding a requested delivery date.

The transportation terms 335 include instructions such as the means and/or route used in transporting the product. The total quantity 340 includes information associated with the quantity of product to be delivered. The total quantity 340 may be the summation of multiple similar sales orders delivered or may reflect a summation of all material quantities 385 or item quantities 365 for the delivery. The logistics package 345 may include information concerning logistical information of the delivery, such as number of packages and content of single packages. An item node 350 includes a delivery identifier 355, an item identifier 360, and an item quantity 365. The delivery identifier 355 includes information specifying the delivery request to which the item corresponds, and generally matches or corresponds to the delivery identifiers 315 of a root node 210. The item identifier 360 includes information as to the identity of the item. The item quantity 365 includes the quantity of products that are requested for delivery. The data structure 300 may include multiple item nodes 350.

The item schedule 370 may include a delivery identifier 375, an item identifier 380, an item quantity 385, a scheduled date 390, and a status 395. The delivery identifier 375 includes information specifying the delivery request to which the item schedule 370 corresponds, and may match the delivery request identifier 315 of a root node 310. The material identifier 380 includes information pertaining to the type of packaging or handling material used during shipping or logistical execution. For example, the material identifier 380 may state that a product must be packaged with a certain size box or that the product requires refrigeration. The material quantity 385 includes the quantity of material that is required for delivery or logistical execution. The scheduled date 390 includes the time or part of a sequence of events in which the delivery is to occur. The status 395 includes the current status of the delivery process, or shipping process, of the product.

The data structure 300 may optionally include other attachments and text collections not specified above that support the delivery processing. An included attachment may include, for example, an electronic spreadsheet detailing information not included elsewhere in the data structure 300 or a word processing document including information related to the delivery or sales order. An included text collection may include optional user comments entered using the sales application or otherwise related to the delivery request.

Figure 4A:
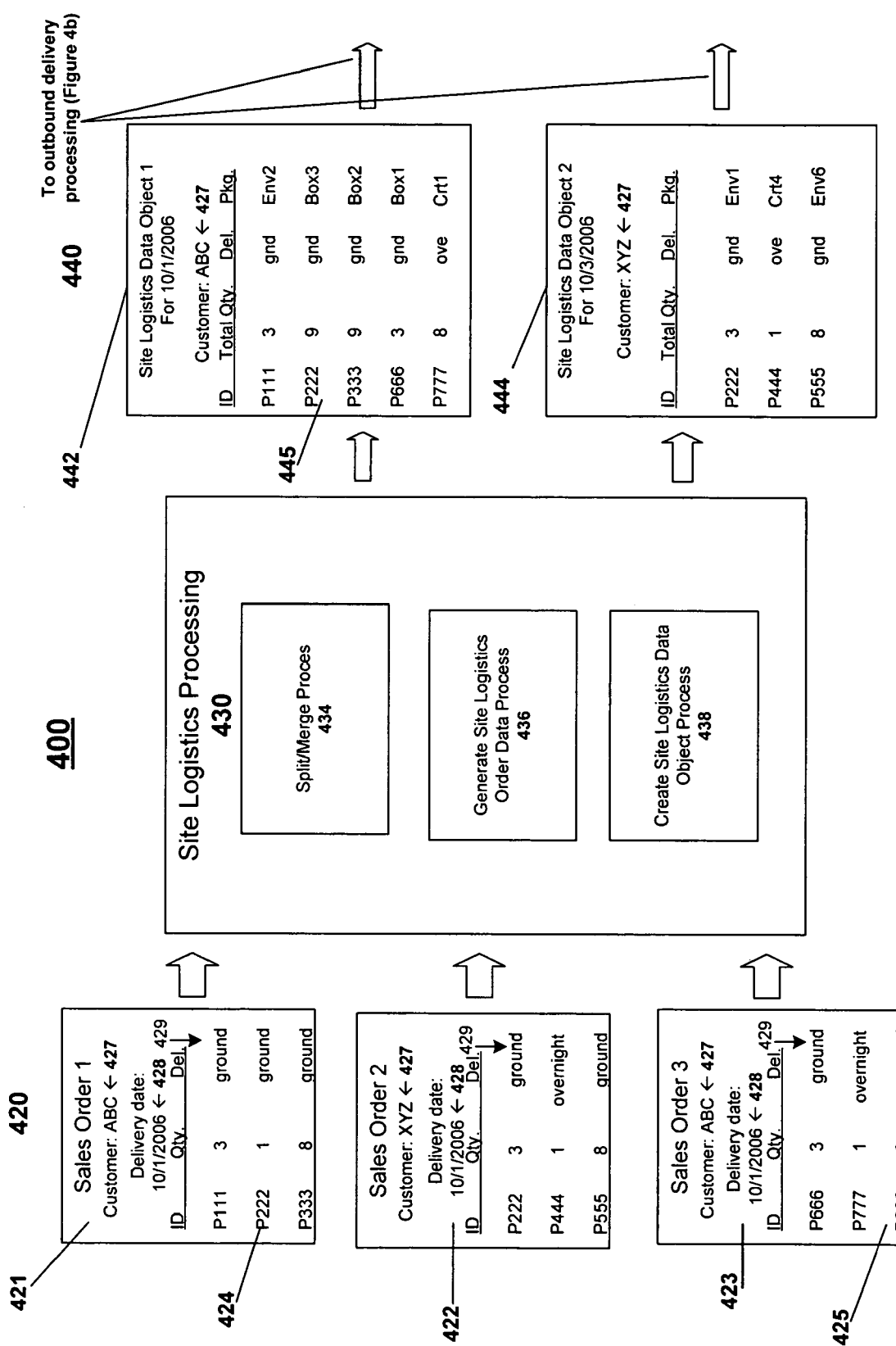
FIG. 4A is a block diagram of an example of site logistics processing of sales order data into a site logistics data object.
Figure 4B:
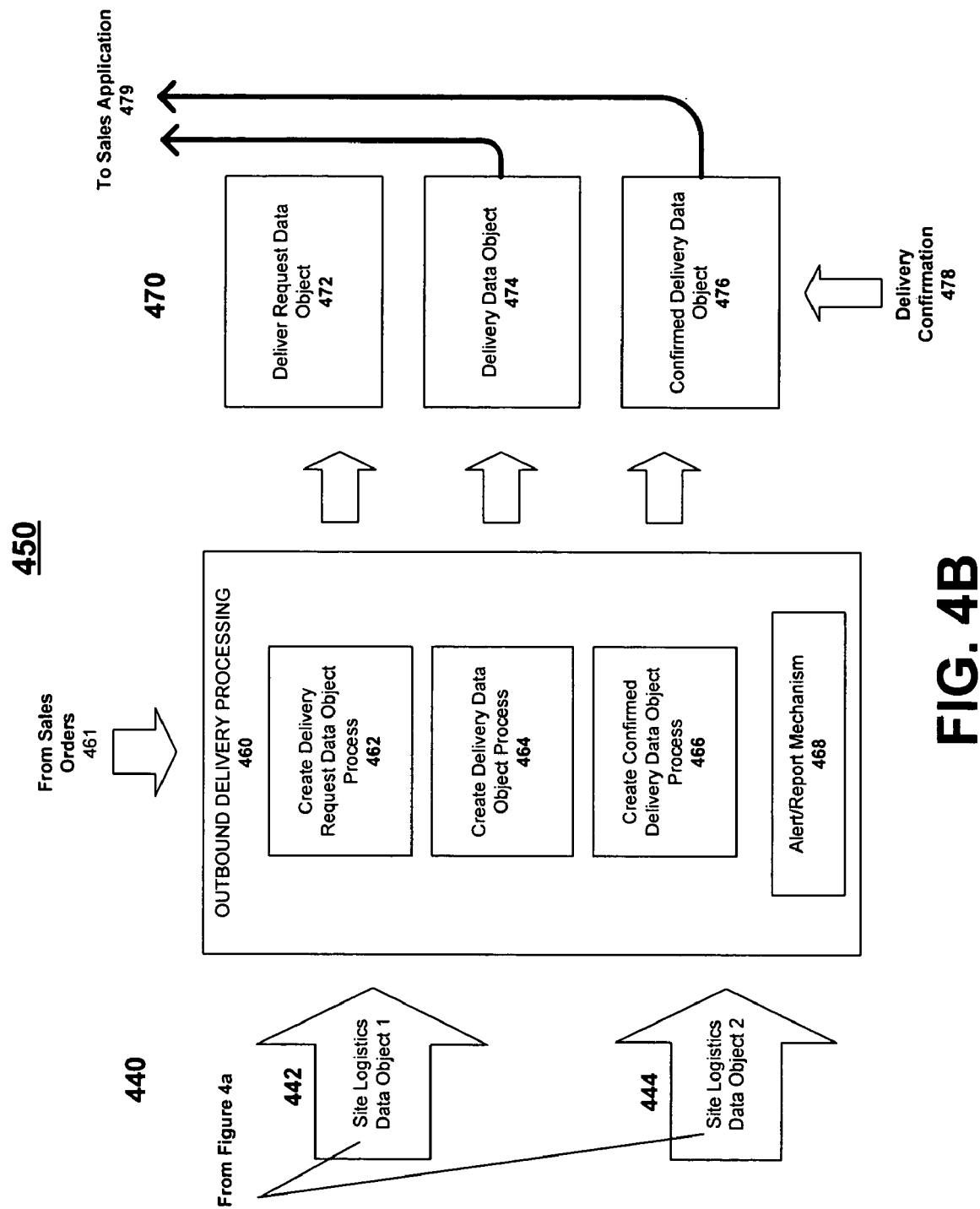
FIG. 4B is a block diagram of an example of outbound delivery processing into data objects.

FIGS. 4A and 4B show a process 400 in which sales order data 420 is processed and various data objects are generated. The structure and arrangement in FIGS. 4A and 4B may be based on the structure and arrangement of FIG. 1. In FIG. 4A, site logistics processing 430 processes sales order data 420 into site logistics data objects 440.

The sales order data 420 includes information related to the order, the product, and the delivery. Order information may include the identity of the product recipient 427. Product information may include product details, such as an internal or external product identifier ("ID"). An external product identifier may correspond to a product identifier used by an external entity, such as a business partner. An internal product identifier may correspond to the identifier used by the business entity itself. Delivery information may include the delivery date 428 and delivery method, means or channel 429. Other information not listed above may be included in the sales data.

The site logistics processing 430 includes a split/merge process 434, a generate site logistics order data process 436, and a create site logistics data object process 438. The split/merge process 434 involves grouping sales orders 420 with similar characteristics, such as the same product recipient, into groups for concurrent processing, or splitting groups with different characteristics for separate processing. The generate site logistics order data process 436 generates data pertaining to site logistic execution of the order. For example, the generate site logistics order data process 436 may use quantities and product type to determine appropriate information in the site logistics data object 440 for packaging. The create site logistics data objects process 438 generates site logistics data objects 440 from individual or grouped sales orders 420. The generated site logistics data objects 440 may incorporate grouped sales from the split/merge process 434 and logistics data generated from the generate site logistics order data process 436. The sales logistics data objects are transferred to the outbound delivery processing 440.

In the example shown in FIG. 4A, sales orders 1-3 (421-423) are sent to the site logistics processing 430 with sales order 1 (421) and sales order 3 (423) placed by customer ABC and sales order 2 (422) placed by customer XYZ. A split/merge process 434 combines sales order 1 (421) and sales order 3 (423) into a first group associated with the common customer. Customer ABC has placed two separate requests for product P222 (424 and 425) in sales order 1 (421) and sales order 3 (423). The two requests (424 and 425) are combined by the generate site logistics order data process 436 to form a single request 445 with a total quantity that is the sum of the separate requests. Data pertaining to appropriate packaging for the total quantity is also determined. Using the sales orders 420, the groups formed by the split/merge process 434, and the data generated by the generate site logistics processing order data 436, the create site logistics data object process 438 forms site logistics data objects 442 and 444. The site logistics data objects 442 and 444 are then sent to outbound delivery processing (FIG. 4B).

FIG. 4B shows a process 450 in which outbound delivery processing 460 receives site logistics data objects 440 (including objects 442 and 444) and input from sales orders 461, and uses these to generate a delivery request data object 472, a delivery data object 474, and a confirmed delivery data object 476.

The outbound delivery processing receives site logistics data objects 440 and input from sales orders 461. The create delivery request data object process 462 uses received data to generate a delivery request data object 472. The delivery request data object 472 includes information related to the sales order 420 and the requested delivery of the product. The structure and arrangement of the delivery request data object 472 may be similar to the structure and arrangement of FIG. 2.

The create delivery data object process 464 uses received data to generate a delivery data object 474. The delivery data object 474 includes information related to the sales order 420, requested delivery of the product, and site and delivery logistics. The structure and arrangement of the delivery data object 474 may be similar to the structure and arrangement of FIG. 3.

The create confirmed delivery data object process 466 uses received data to generate a confirmed delivery data object 476. The confirmed delivery data object 474 includes information related to the delivery of the product and is used to verify receipt of the product.

The alert/report mechanism 468 generates notices in the event of an occurrence that may or may not be planned. An alert/report notice may take the form of a digital message, an audio indication, or another type of notification to an individual, a group, or a computer system of the event occurrence. For example, if a site logistics data object 440 requests a product quantity that is beyond available quantities, the alert/report mechanism may notify warehousing of the shortage.

The confirmed delivery data object 476 notifies the sales application 479 when a delivery confirmation 478 is received. The delivery confirmation 478 may be a notification that a certain stage of delivery has been achieved, such as that a package has been left at a location, and may include, or may be initiated by, feedback from the product recipient. The delivery data object 474 also may be provided to the sales application 479 to provide information related to site and delivery logistics, such as packaging for a delivery.

Figure 5:
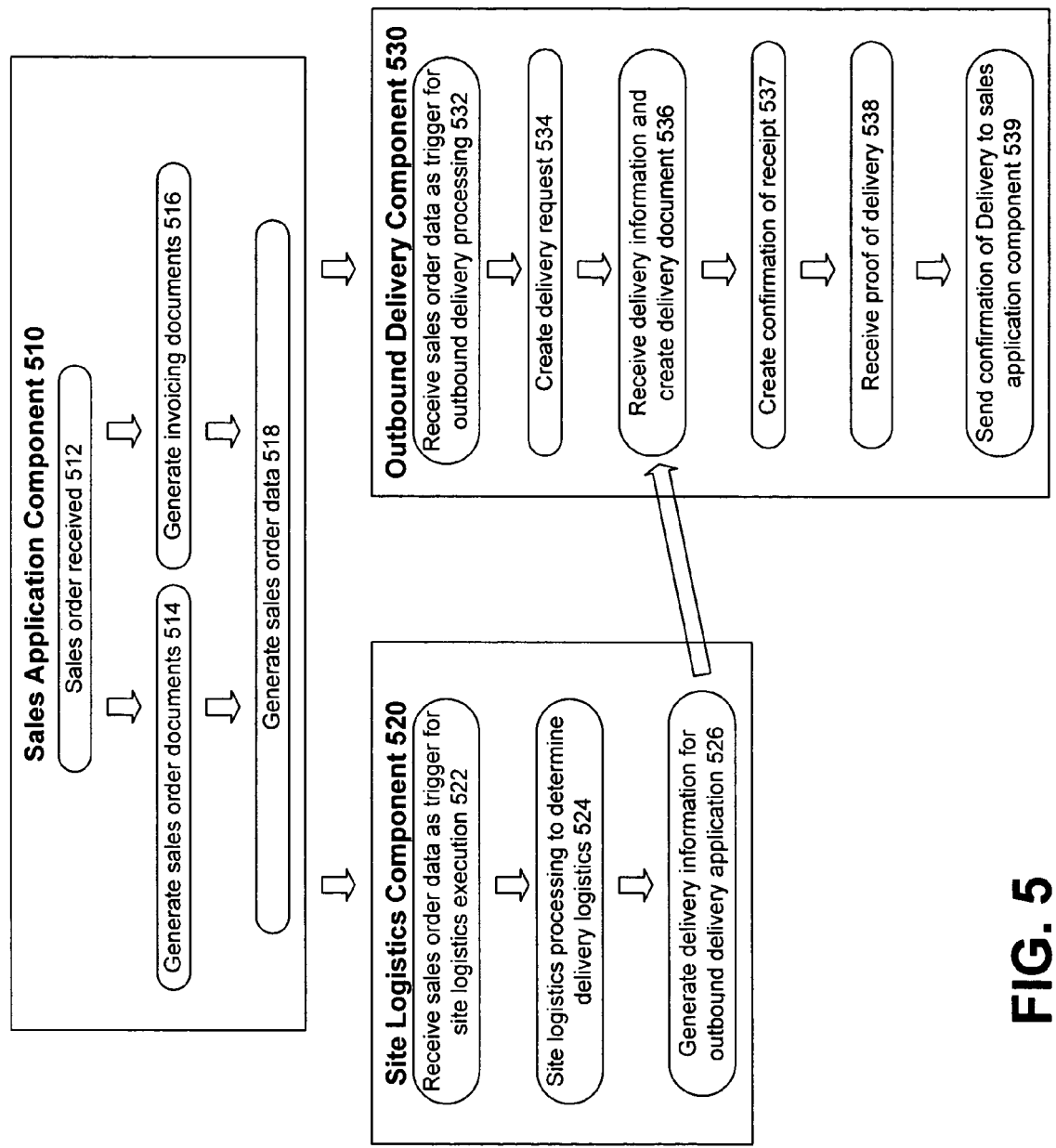
FIG. 5 is a block diagram illustrating outbound communication and logistical processing.

FIG. 5 includes a diagram 500 that demonstrates communication and logistical processing that may occur using, for example, the computer system 100 of FIG. 1. The logistical process starts with the sales application component 510, which communicates with the site logistics component 520 and the outbound delivery component 530. The site logistics component 520 is interconnected with the outbound delivery component 530.

The sales application component 510 receives a sales order (512). After receiving the sales order, sales order documents are generated (514). The sales order data then is generated (518). The sales order data is sent to both the site logistics component 520 and the outbound delivery component 530.

The site logistics component 520 receives the sales order data as a trigger for site logistics execution (522). The site logistics processing is carried out to determine delivery logistics, such as packing details (524). Then, delivery information for the outbound delivery application is generated (526). The delivery information is sent to the outbound delivery component 530.

The outbound delivery component 530 receives, from the sales application component 510, the sales order data as a trigger for outbound delivery processing (532), and generates a delivery request (534). After delivery information, such as packing details, is received from the site logistics component 520, delivery documents are created (536) along with a confirmation of receipt (537). After receiving proof of delivery (538), the confirmation receipt is sent to the sales application component (539), which generates invoicing documents (516) related to the confirmed delivery.

FIG. 6 shows an enterprise information technology (IT) system 600 that includes a logistics execution application 610 having a site logistics component 620 and an inbound delivery component 630. As such, the logistics execution application 620 separates operations related to logistics execution at a logistics site from documentation of delivery processing to enable supply chain management.

More particularly, the site logistics component 620 includes instructions 625 for site logistics processing. In general, site logistics processing is related to operations of site logistics execution application component 620 and, as such, generally represents an internal view of operations related to the logistics site. The instructions 625, when executed by a processor or processors of the enterprise IT system 600 on which the logistics execution application is operating, perform operations related to logistics execution at a logistics site. For convenience, the execution of instructions 625 that causes the computer system 600 to perform some operation may be described as having the site logistics component 625 perform the operation.

The logistics execution application 620 also includes an inbound delivery component 630 that performs operations related to inbound delivery processing 635. In general, inbound delivery processing 635 is related to delivery operations and, as such, generally represents an external view in that it may focus on communicating with, and information relevant to, a product provider. More particularly, the inbound delivery component 630 includes instructions for documenting inbound delivery processing 635 related to logistics. The inbound delivery processing 635 receives a site logistics data object 627 and purchase order data 655 and generates a delivery request data object 642, a delivery data object 644, and a confirmed delivery data object 646. The delivery request data object 642 includes information related to the purchase order data 655 and requested delivery of the product. The structure and arrangement of the delivery request data object 642 may be similar to the structure and arrangement of the data structure 200 shown in FIG. 2. The delivery data object 644 includes information related to the purchase order data 655, requested delivery of the product, and site and delivery logistics. The structure and arrangement of the delivery data object 644 may be similar to the structure and arrangement of the data structure 300 shown in FIG. 3. The confirmed delivery data object 646 includes information related to the delivery of the product and is used to verify receipt of the product. The inbound delivery component 630 provides delivery confirmation to the purchase order application 650 (as indicated by flow 646S).

Figure 7:
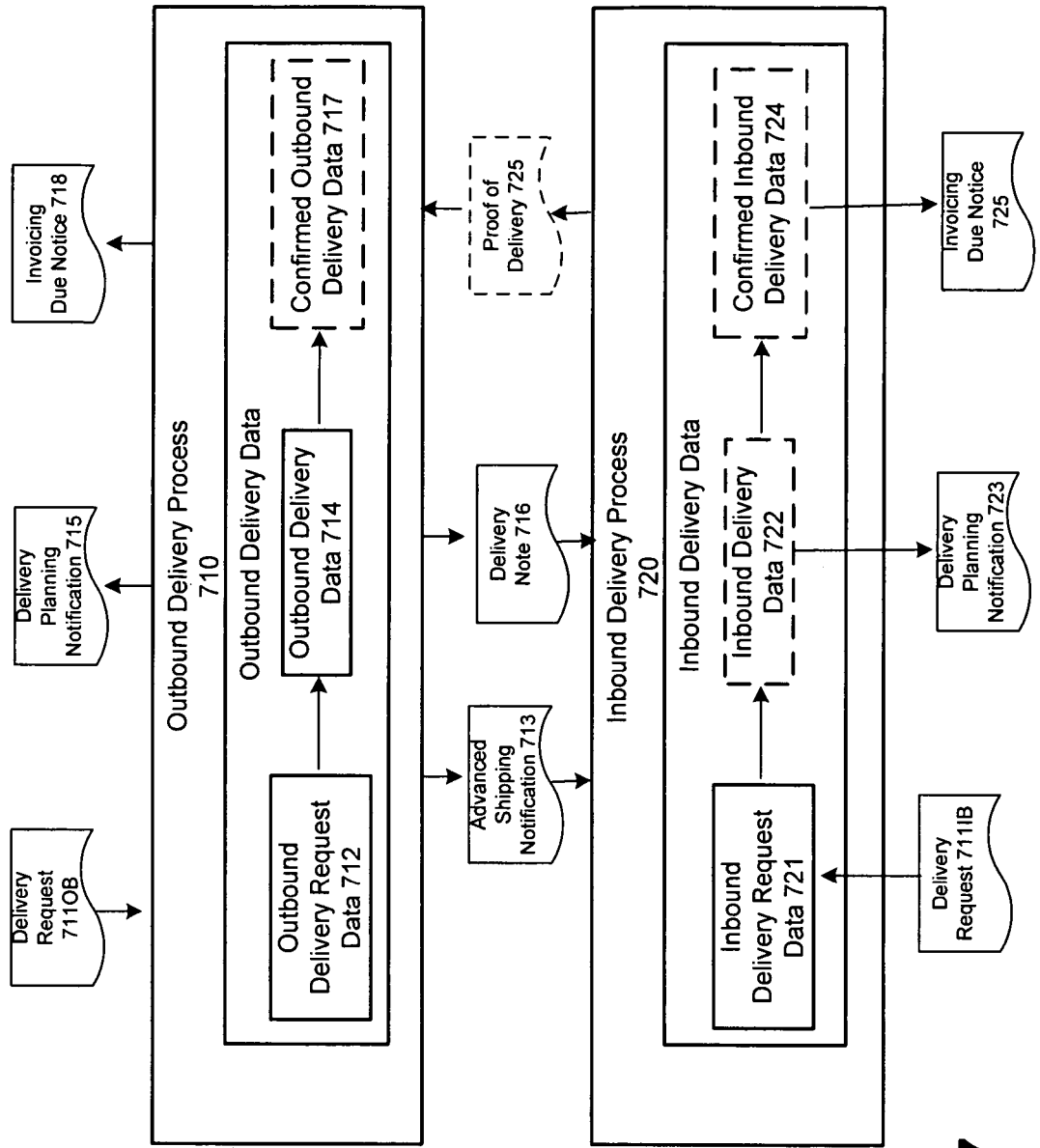
FIG. 7 is a block diagram illustrating communication and logistical processing between outbound and inbound delivery processing.

FIG. 7 shows a block diagram 700 illustrating communication and logistical processing between outbound and inbound delivery processing. In one example, the outbound delivery processing is performed by a logistics execution application operating on a distributor or supplier computer system, and the inbound delivery processing is performed by a logistics execution application operating on a customer computer system. The products are shipped from the distributor or supplier to a customer.

The block diagram 700 includes an outbound delivery process 710 that is interconnected with an inbound delivery process 720. The outbound delivery process 710 receives a delivery request 711OB triggering delivery processing. For example, the delivery request 711OB may be based on a sales order created in the distributor or supplier's computer system that indirectly corresponds to a purchase order created in the customer's computer system, which is the basis as delivery request 711IB that triggers inbound delivery processing.

More particularly, the outbound delivery process 710 receives a delivery request 711OB, which causes the process 710 to generate outbound delivery request data 712, which may be an outbound delivery request object having the data structure 200 of FIG. 2. The process 710 also generates, based on receiving site logistics information, outbound delivery data 714, which may be an outbound delivery object having the data structure 300 of FIG. 3. The outbound delivery process 710 generates, based on outbound delivery data 714, an advanced shipping notification 713, which is transferred to the inbound delivery process 720. The notification 713 supports inbound logistical execution by giving notice of outbound delivery prior to the occurrence of the delivery. The outbound delivery process 710 also generates, based on outbound delivery data 714, a delivery note 716 that documents the delivery, including logistics information relevant to the delivery. The outbound delivery process 710 transfers the delivery note 716 to the inbound delivery process 720.

The outbound delivery process 710 also generates a delivery planning notification 715 which provides confirmation of planning notification to the distributor or supplier operating the outbound delivery process 710.

Also, the process 710 generates an invoicing due notice 718 and transfers the notice 718 to an appropriate application or service, such as the sales application. The process 710 may generate the invoicing due notice 718 conditioned upon receipt of proof of delivery 725, which is received from the inbound delivery process 720.

The inbound delivery process 720 receives a delivery request 711IB. For example, the inbound delivery process 720 may receive a delivery request 711IB from a purchase order application or a procurement or requisition process. The delivery request 711IB indirectly corresponds to the delivery request 711OB in that the delivery request represents a sales order entered in the distributor or supplier computer system that indirectly corresponds to a purchase order entered in the customer computer system. In some implementations, the delivery requests 711OB and 711IB may be generated from the same data, such as when the computer system of the distributor or supplier operating the outbound delivery process 710 is able to receive data from, or is otherwise logically or physically, electronically connected with the computer system operating the inbound delivery process 710 related to the customer to whom the delivery is to be delivered.

The request 711IB causes the process 720 to generate inbound delivery request data 721, which may be an implementation of a delivery request data object of objects. 634 of FIG. 6. The inbound delivery process 720 receives, from the outbound delivery process 710, the advanced shipping notification 713 and the delivery note 716. The inbound delivery process 720 generates inbound delivery data 722, based on the received advanced shipping notification 713 and/or the delivery note 716. The inbound delivery data 722 may be an implementation of a delivery data object 636 of FIG. 6. The inbound delivery process 720 generates a delivery planning notification 723 to confirm planning notification to the customer operating the inbound delivery process 720. The inbound delivery process 720 transfers the notification 723 to, for example, a purchase order application. When the delivery is received, the inbound delivery process 720 generates confirmed inbound delivery data 724, which may be an implementation of object 638 of FIG. 6. After the delivery occurrence, and based on the confirmed delivery data 724, the inbound delivery process 720 generates a proof of delivery 725 and sends the proof 725 to the outbound delivery process 710. Finally, the process 720 generates an invoicing due notice 726 and transfers the notice 726 to, for example, the purchase order application or a financial application of the customer operating the inbound delivery process 720.

In some implementations, the outbound delivery process 710 may be performed by a logistics execution application developed by a commercial application developer, and the inbound delivery process 720 may be performed by a logistics execution application developed by a commercial application developer that is different than the developer of the logistics execution application that performs the outbound delivery process 710. In such a case, the logistics execution applications may be operated by the same business entity, and the communication between the outbound delivery process 710 and the inbound delivery process 720 helps to enable the logistics execution applications developed by different commercial application developers to communicate.

Figure 8:
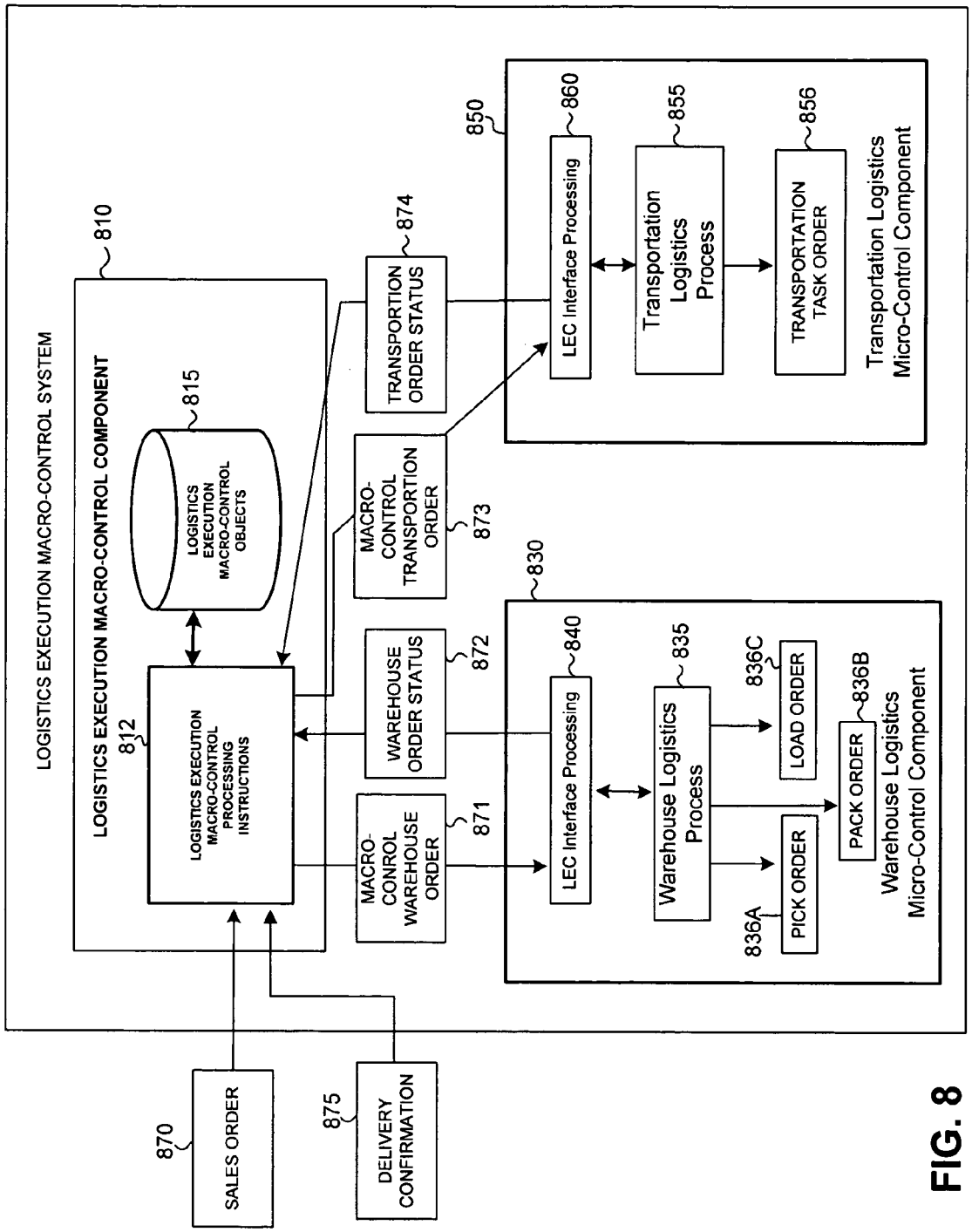
FIGS. 8-10 are block diagrams of logistics execution macro-control systems.
Figure 9:
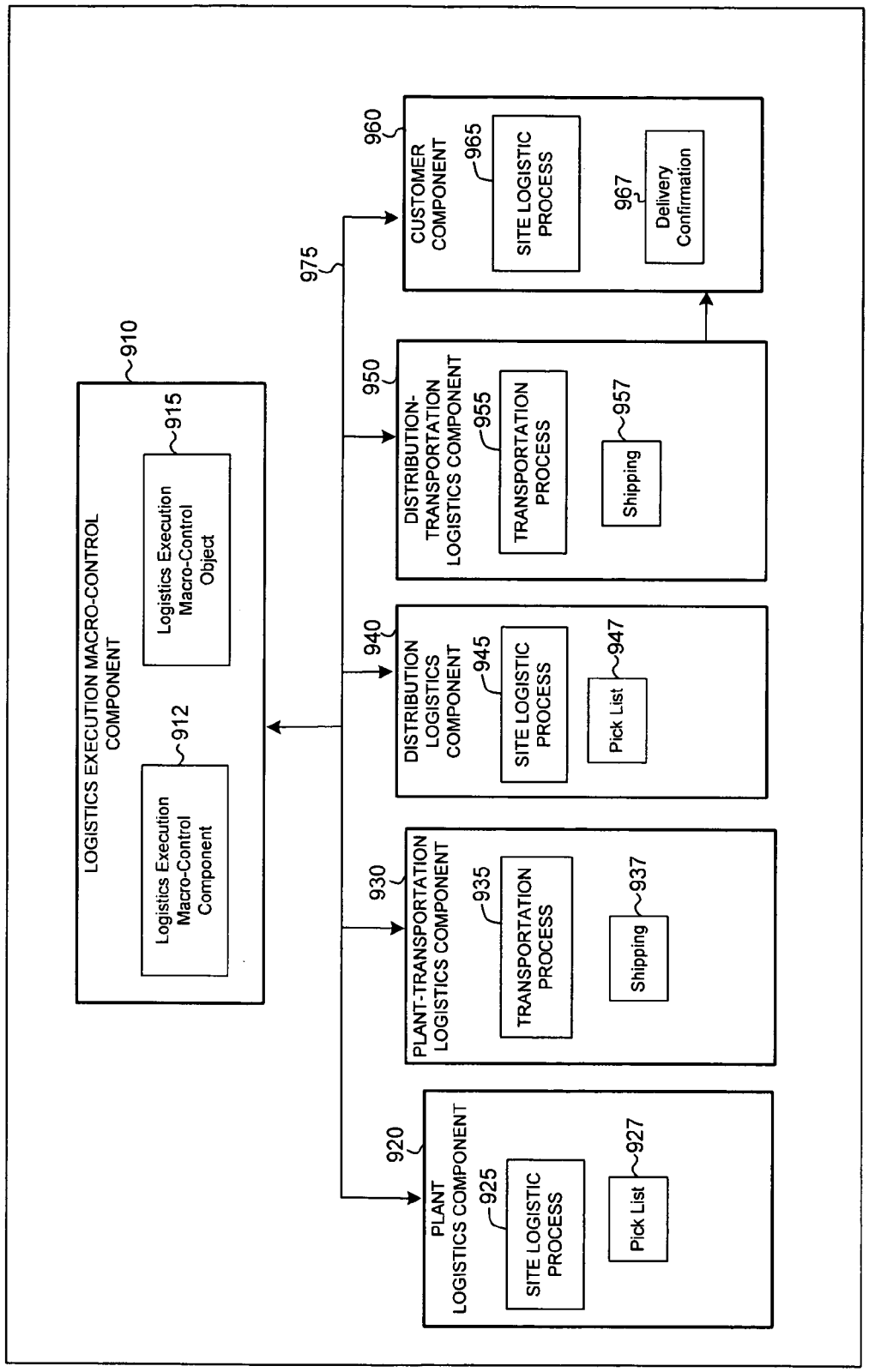
Figure 10:
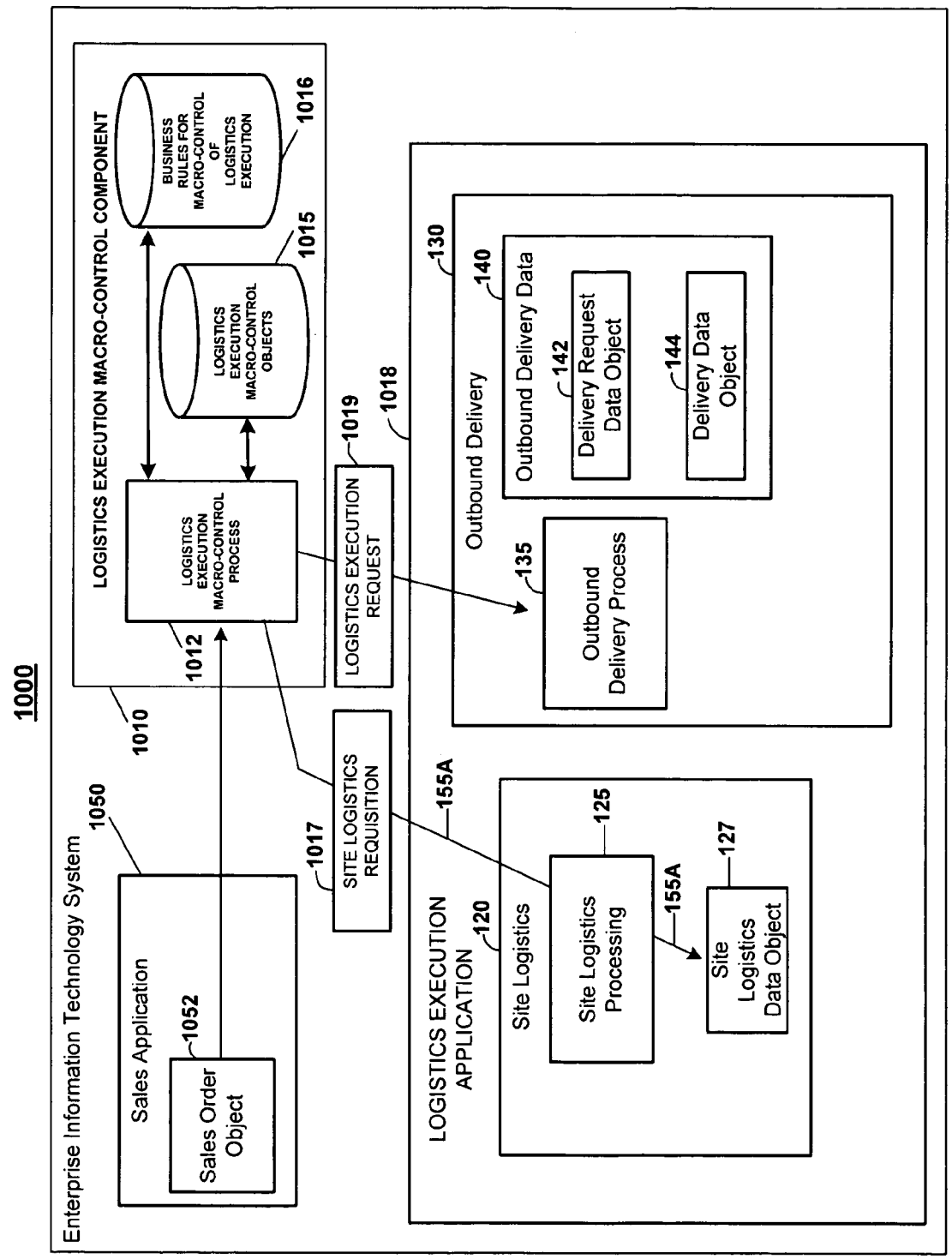

Referring to FIGS. 8-10, logistics execution macro-control systems provide macro-level control and views of logistics execution, particularly with respect to transportation and delivery of goods to product recipients and pickup of goods from vendors. A micro-level system for logistics execution controls particular logistics execution activities, operations or processes and generally does so at a single physical or logical site. In contrast, a logistics execution macro-control system controls and coordinates logistics execution performed by different computer applications and/or business entities that together form an integrated logistics execution process. In one example, to fulfill a sales order for a customer, goods must be transported from one or more plants to one or more distribution centers and then from the one or more distribution centers to the customer's location (or locations). A series of logistics execution activities occur that include warehouse management activities at the plants, the distribution centers, and the customer locations. The series of logistics execution activities also include transportation activities related to transporting goods from a plant to a distribution center and transporting goods from a distribution center to the customer's location. A logistics execution macro-control system initiates, controls and/or guides the warehouse and transportation macro-level logistics execution activities related to delivery.

Such macro-control for logistics execution may be provided, for example, by a centralized logistics execution macro-control component that generates and transmits appropriate macro-level logistics execution orders (or other types of triggers) to logistics execution micro-components to initiate control logistics execution by the micro-components. Macro-control for logistics execution may be provided by including macro-control logic within the logic of the micro-logistics components. The macro-control logic enables cross-application or cross-component control of macro logistics processes, such as a process to start a particular micro-logistics activity or process. Macro-control of logistics execution may be provided by a business object (or another type of data collection) that is transmitted or accessible to the micro-logistics components and that stores information that enables macro-control of logistics execution.

FIG. 8 shows one example of a logistics execution macro-control system 800 having a logistics execution macro-control component 810 and two micro-control logistics components: a warehouse logistics micro-control component 830 and a transportation logistics micro-control component 850. The logistics execution macro-control system 800 may include one or more computer application programs (e.g., software) executing on one or more computer systems. The computer application programs may be commercial computer applications sold by the same or different commercial software developers, though the computer applications need not necessarily be commercial software.

The logistics execution macro-control component 810 includes instructions 812 for controlling macro-logistic operations (and facilitating communication) across the logistics micro-control components 830 and 850. The logistics execution macro-control component 810 also includes data store 815 having logistics execution macro-control objects. In general, the logistics execution macro-control component 810 is configured to generate and transmit various logistics execution macro-control orders to control logistics on a macro-level to facilitate or control deliveries of goods to product recipients or pick-up of goods from vendors.

The warehouse logistics micro-control component 830 includes a warehouse logistics process 835 having instructions and data for controlling micro-logistics activities at a warehouse. As shown, the warehouse logistics process 835 is configured to generate a pick order 836A, a pack order 836B and a load order 836C for fulfilling an order for goods to be supplied by the warehouse. The warehouse logistics process 835 may be an implementation of site logistics processing 125 of FIG. 1. The warehouse logistics micro-control component 830 also includes a logistics execution macro-control interface 840 for exchanging communications with the logistics execution macro-control component 810. The macro-control interface 840 may be implemented, for example, by one or more application program interfaces (APIs).

The transportation logistics micro-control component 850 includes transportation logistics process 855 having instructions and data for controlling micro-logistics activities related to transporting goods for delivery. As shown, the transportation logistics process 855 is configured to generate a transportation task order 856 for transporting goods for delivery to a product recipient. The transportation logistics micro-control component 850 also includes a logistics execution macro-control interface 860 for exchanging communications with the logistics execution macro-control component 810. The macro-control interface 860 may be implemented, for example, by one or more APIs. In some implementations, the macro-control interface 860 may be the same interface as the macro-control interface 840.

In one example of how the logistics execution macro-control system 800 may control macro-level logistics for a delivery to a product recipient, a sales order 870 identifying products to be delivered to a customer is received by the logistics execution macro-control component 810. The logistics execution macro-control system 800 may be triggered by other conditions, including the identification or receipt of other types of customer requirements and the identification or receipt of internal requirements (such as a procurement order to obtain goods or an order regarding internal movement of stock at a warehouse). In this example, the logistics execution macro-control component 810 generates, based on the sales order 870, a macro-control warehouse order 871, which is transmitted to the warehouse logistics micro-control component 830. The logistics execution macro-control component 810 also generates, based on the sales order 870, a macro-control object that includes logistics execution macro-control information related to fulfilling the sales order transaction. The logistics execution macro-control component 810 stores the macro-control object in the logistics execution macro-control objects 865.

The logistics execution macro-control interface 840 of the warehouse logistics micro-control component 830 receives the macro-control warehouse order 871 and transmits the order 871 to warehouse logistics process 835, which, in turn, creates one or more logistics execution micro-control orders necessary to execute logistics activities related to the received macro-control warehouse order 871. In this example, the warehouse logistics process 835 generates a pick order 836A, a pack order 836B and a load order 836C to package goods identified in the macro-control warehouse order 871 for transportation to the product recipient identified in the macro-control warehouse order 871. After the goods are packaged (as indicated, for example, by the completion of the pack order 836B), the warehouse logistics process 835 provides delivery status information to the logistics execution macro-control interface 840, which transmits, based on the delivery status information, a warehouse order status 872 to the logistics execution macro-control component 810.

The logistics execution macro-control component 810 receives and processes the warehouse order status 872 to generate a macro-control transportation order 873 to initiate transport of the package from the warehouse to the product recipient. The logistics execution macro-control component 810 also updates, based on the warehouse order status 872 and the transportation order 873, the macro-control object related to the sales order 870 in logistics execution macro-control objects of the data store 815. The logistics execution macro-control component 810 transmits the macro-control transportation order 873 to the transportation logistics micro-control component 850.

The logistics execution macro-control interface 860 of the transportation logistics micro-control component 850 receives the macro-control transportation order 873 and transmits the order 873 to transportation logistics process 855, which, in turn, creates one or more logistics execution micro-control orders necessary to execute logistics activities related to the received macro-control transportation order 873. In this example, the transportation logistics process 855 generates a transportation task order 856 to pick up the packaged goods identified in the macro-control warehouse order 875 from the warehouse (also identified in the macro-control warehouse order 875) for transportation to the product recipient identified in the macro-control warehouse order 875. After the goods are in transit to the product recipient, the transportation logistics process 855 provides delivery status information to the logistics execution macro-control interface 860, which transmits, based on the delivery status information, a transportation order status 874 to the logistics execution macro-control component 810.

The logistics execution macro-control component 810 receives and processes the transportation order status 873 to update the macro-control object related to the sales order 870 in the logistics execution macro-control objects of data store 815. A delivery confirmation 875 is received by the logistics execution macro-control component 810 once delivery of the goods to the product recipient has been confirmed. Based on confirmation of delivery, the logistics execution macro-control component 810 updates the macro-control object related to the sales order 870 in the logistics execution macro-control objects of data store 815. In some implementations, delivery confirmation 875 may be provided by the transportation logistics micro-control component 850.

As such, the logistics execution macro-control component 810 controls, at a macro-level, logistics execution by both the warehouse logistics micro-component 830 and the transportation logistics micro-component 850 to fulfill the business transaction identified by the sales order 870. The logistics execution macro-control component 810 also provides a macro-control object that maintains logistics execution status information related to logistics execution for a particular sales order.

The generation of orders 871 and 873 need not necessarily be serial or conditioned upon completion of a prior logistics operation. For example, a macro-control transportation order 873, or another form of advance notification, may be provided to the transportation logistics micro-control component 850 at substantially the same time the macro-control warehouse order 871 is provided to the warehouse logistics micro-control component 830. In some implementations, the orders 871 and 873 and the order status information 872 and 874 may be provided in a single business or data object. For example, a macro-control object may include a root node identifying the particular business transaction (e.g., a sales order) for which logistics are to be executed. The macro-control object may include various sub-components or nodes that enable multiple macro-control logistics to be identified and controlled.

Macro-control of logistics execution micro-control components need not necessarily be performed through exchange of messages between the logistics execution macro-control component 810 and the micro-control components 830 and 850. In one example of an alternative or additional implementation, the components 810, 830 and 850 could be configured to access a logistics execution database (or other type of data collection) having macro-control objects that are used to identify micro-processing to be performed to fulfill a business transaction.

FIG. 9 depicts another example of a logistics execution macro-control system 900 having a logistics execution macro-control component 910 and micro-control logistics components 920, 930, 940 and 950. In this example, the logistics execution macro-control component 910 also exchanges communications with a customer component 960 for performing logistics at the customer's location. The logistics execution macro-control component 910 includes a logistics execution macro-control process 912 and a logistics execution macro-control object 915 that control, on a macro-level, logistics execution performed by a plant logistics execution component 920, a plant-transportation logistics execution component 930, a distribution logistics execution component 940 and a distribution-transportation logistics execution component 950 in fulfilling a sales order by a customer associated with customer component 960. The components 910-960 of the logistics execution macro-control system 910 reside on separate computer systems that are geographically distributed and are interconnected through communication links 975. The communication links 975 may be part of one or more networks including the Internet, wide area networks (WANs), local area networks (LANs), or any other wired or wireless network.

The logistics execution macro-control component 910, in response to receiving a sales order (or another type of an event that triggers logistics execution macro-level processing), generates a logistics execution macro-control object for use in initiating logistics execution activities in each of micro-control logistics execution components 920, 930, 940 and 950. More particularly, the logistics execution macro-control process 912 generates the logistics execution macro-control object 915 including information to identify the customer associated with the triggering sales order, the goods to be delivered to the customer, and transportation or other delivery requirements. In the example of FIG. 9, the goods to be delivered are obtained from a manufacturing plant, transported to a distribution center, and later transported from the distribution center to the customer location.

The logistics execution macro-control component 910 sends, over communication links 975, the logistics execution macro-control object 915 to the plant logistics component 920. Based on the macro-control object 915, the site logistics process 925 of the plant logistics component 920 creates logistics execution micro-control object (i.e., a pick list) 927 that identifies goods to be delivered to a distribution center. The plant logistics execution component 920 updates the logistics execution macro-control object 915 to indicate that the goods have been packaged and are ready to be shipped to the distribution center and sends the logistics execution macro-control object 915 to the logistics execution macro-control component 910 over the communication links 975.

The logistics execution macro-control component 910 receives the updated logistics execution macro-control object 915 from the plant logistics execution component 920. The logistics execution macro-control component 910 processes the updated logistics execution macro-control object 915 to determine the next macro-level logistics execution activity to be performed. To do so, for example, the logistics execution macro-control process 912 may use a database of business rules that identify macro-level logistics execution activities to be performed for types of products or business entities. In the example of FIG. 9, the next macro-level logistics execution activity is to ship the goods packaged at the plant to the distribution center. The logistics execution macro-control component 910 configures the logistics execution macro-control object 915 to initiate transportation logistics execution for the sales order and sends the configured logistics execution macro-control object 915 to the plant-transportation logistics execution component 930.

Based on the logistics execution macro-control object 915, the transportation process 935 of the plant-transportation logistics component 930 creates logistics execution micro-control object (i.e., a shipping document) 937 that identifies transportation information for the goods to be delivered to the distribution center. The plant-transportation logistics execution component 930 updates the logistics execution macro-control object 915 to indicate that the goods have been shipped to the distribution center and sends the logistics execution macro-control object 915 over the communication links 975 to the logistics execution macro-control component 910.

The logistics execution macro-control component 910 receives the updated logistics execution macro-control object 915 from the plant-transportation logistics execution component 930. The logistics execution macro-control component 910 processes the updated logistics execution macro-control object 915 to determine the next macro-level logistics execution activity to be performed. Here, the next macro-level logistics execution activity is to add goods from the distribution center to the goods received from the plant. The logistics execution macro-control component 910 configures the logistics execution macro-control object 915 to initiate logistics execution activities package additional goods for the sales order and sends the configured logistics execution macro-control object 915 to the distribution logistics execution component 940.

Based on the logistics execution macro-control object 915, the site logistic process 945 of the distribution logistics execution component 940 creates a logistics execution micro-control object (i.e., a pick list) 947 that identifies goods to be delivered. The distribution logistics execution component 940 updates the logistics execution macro-control object 915 to indicate that the goods have been packaged and are ready to be shipped to the customer location and sends the logistics execution macro-control object 915 over the communication links 975 to the logistics execution macro-control component 910.

The logistics execution macro-control component 910 receives the updated logistics execution macro-control object 915 from the distribution logistics execution component 940. The logistics execution macro-control component 910 processes the updated logistics execution macro-control object 915 to determine the next macro-level logistics execution activity to be performed. In the example of FIG. 9, the next macro-level logistics execution activity is to ship the goods received and added at the distribution center to the customer location. The logistics execution macro-control component 910 configures the logistics execution macro-control object 915 to initiate transportation logistics execution for this aspect of fulfilling the sales order and sends the configured logistics execution macro-control object 915 to the distribution-transportation logistics execution component 950.

Based on the logistics execution macro-control object 915, the transportation process 955 of the distribution-transportation logistics component 950 creates logistics execution micro-control object (i.e., a shipping document) 957 that identifies transportation information for the goods to be delivered to the customer location. The distribution-transportation logistics execution component 950 updates the logistics execution macro-control object 915 to indicate that the goods have been shipped to the customer location and sends the logistics execution macro-control object 915 over the communication links 975 to the logistics execution macro-control component 910.

The logistics execution macro-control component 910 receives the updated logistics execution macro-control object 915 from the distribution-transportation logistics execution component 950. The logistics execution macro-control component 910 processes the updated logistics execution macro-control object 915 to determine the next macro-level logistics execution activity to be performed. In this example, there is not a macro-level logistics execution activity to be performed based on the updated logistics execution macro-control object 915 received from the distribution-transportation logistics execution component. When the customer component 960 receives the shipment of goods, the customer component 960 generates and sends a delivery confirmation 967 to the logistics execution control component 910. The logistics execution macro-control component 910 updates the logistics execution macro-control object 915 with actual delivery information from the received delivery confirmation 967.

In some implementations, the logistics execution macro-control component 910 may generate and send, to a logistics execution component 920, 930, 940 or 950, logistics execution business objects in addition to, or in lieu of, the logistics execution macro-control object. For example, based on business rules and an indication of a preceding logistics execution process, the logistics execution macro-control component may transform data included in the logistics execution macro-control object to generate a business object able to be processed by a succeeding logistics execution process.

The logistics execution macro-control component 910 is configured to provide a user interface (not shown) that provides visibility into the logistics execution process at the macro-operation level. In some implementations, the logistics execution macro-control component 910 may be operated by a third-party service provider unrelated to the business entity or entities otherwise involved in performing logistics execution activities.

FIG. 10 illustrates yet another example of a logistics execution macro-control component 1010 operating as part of an enterprise IT system 1000. The logistics execution macro-control component 1010 provides macro-operation level control for logistics execution activities controlled at a micro-level of operation by logistics execution application 1018 having a site logistics component 120 and an outbound delivery component 130. The logistics execution application 1018 may be an implementation of logistics execution application 115 of FIG. 1. The logistics execution macro-control component 1010 generates a logistics execution macro-control object that has information relevant to controlling logistics execution at a macro-level to fulfill the sales order. The logistics execution macro-control component 1010 creates, using business rules 1016, a business object to send to site logistics component 120 to trigger one or more micro-level logistics execution activities. In some implementations, a business rule entry in business rules 1016 includes a condition and an indication of a macro-logistic operation to be performed when the condition is met. In one example, a business rule entry may include a condition of "package-ready-to-ship" and a macro-logistic operation of "initiate-transportation".

The site logistics component 1020 provides feedback to the logistics execution macro-control component 1010 regarding completion of macro-level logistics execution. The logistics execution macro-control component 1010, in turn, updates the corresponding logistics execution macro-control object and, uses business rules and the current state of the logistics execution macro-control object to determine whether one or more additional macro-level logistics execution operations are to be performed. If so, the logistics execution macro-control component 1010 generates an appropriate business object to trigger the next macro-control logistics execution operation or operations. This proceeds until the business transaction that initiated the macro-level logistics execution is completed or cancelled.

More particularly, a sales order object 1052 created in sales application 1050 triggers macro-level logistics execution control by the macro-control logistics execution control component 1010. The logistics execution macro-control component 1010 generates and stores a logistics execution macro-level object using the sales order object 1052 and the business rules 1016. The logistics execution macro-level object corresponds to the sales order and is used to control and monitor macro-level logistics execution to fulfill the sales order. The logistics execution macro-control component 1010 also generates a site logistics requisition object 1017 using the sales order object 1052 and the business rules 1016. The logistics execution macro-control component 1010 sends the site logistics requisition object 1017 to the site logistics component 1020.

The site logistics requisition 1017 triggers the site logistics component 1020 to perform micro-level logistics execution operations, including picking, packing and loading operations. The site logistics component 1020 also may execute logistics related to transportation. As shown, the site logistics requisition triggers the site logistics component 1020 to generate a site logistics data object 127 to control micro-level logistics execution.

In the example of FIG. 10, the logistics execution macro-control component 1010 also creates and sends a business object to outbound delivery component 130 to document the sales order. More particularly, a logistics execution request 1019 is sent to outbound delivery process 135 of the outbound delivery component 130, which generates a corresponding delivery request data object 142 to document the sales order. Also in the example of FIG. 10, the site logistics component 1020 transmits information about packaging of the goods to be shipped to the outbound delivery process 135 of the outbound delivery component 130, which generates a delivery data object 144 to document packages to be shipped to fulfill the sales order.

As illustrated in FIG. 10, the logistics execution macro-control component 1010 is able to control logistics execution at a macro-level by controlling logistics execution by generation of various data objects (here, site logistics requisition 1017 and logistics execution request 1019) to trigger macro-level logistics execution and documentation.

Figure 11:
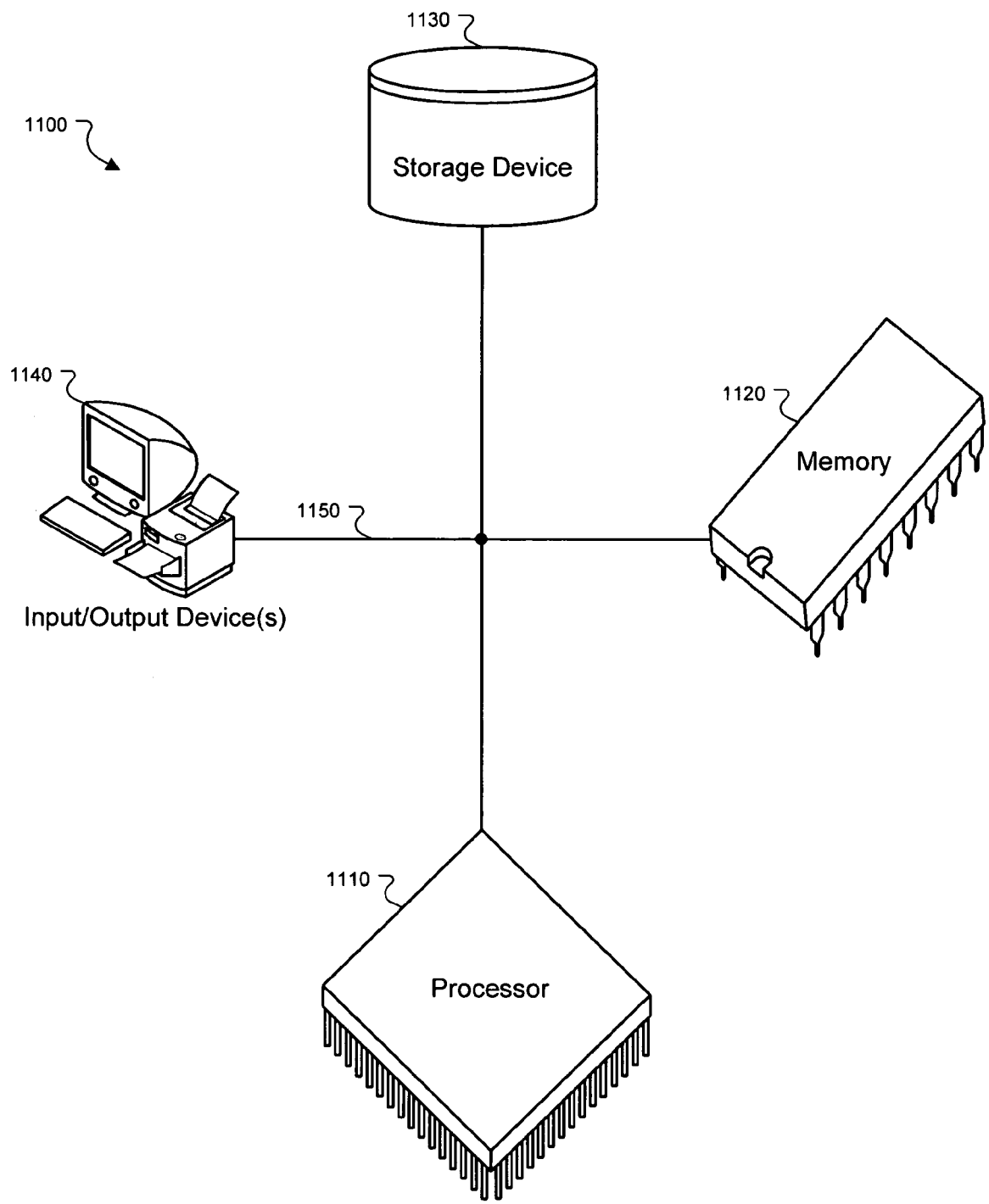
FIG. 11 is a schematic diagram of a generic computer system.

FIG. 11 is a schematic diagram of a generic computer system 1100. The system 1100 can be used for the operations described in association with logistics execution according to one implementation. For example, the system 1100 may be included in either or all of the computer system 100 of FIG. 1, the enterprise information technology system 600 of FIG. 6 and logistics execution macro-controls system 800 of FIG. 8.

The system 1100 includes a processor 1110, a memory 1120, a storage device 1130 and an input/output device 1140. Each of the components 1110, 1120, 1130 and 1140 are interconnected using a system bus 1150. The processor 610 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The techniques for logistics execution have been generally described referring to separate inbound and outbound delivery processing components. Many of the described techniques also are applicable to a delivery processing component that performs both inbound and outbound delivery processing.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

It will be understood that various modifications may be made without departing from the spirit and scope of the claims. For example, useful results may be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A storage device for use in managing a supply chain for a business enterprise in a manner that is applicable to many different business enterprises, the storage device comprising instructions that, when executed by a processing apparatus, result in operations comprising:
   creating, by the processing apparatus, a planning-delivery data object for use in documenting planned delivery of goods or services related to a business transaction;
   creating, by the processing apparatus, a shipping-delivery data object for use in documenting shipment of at least some of the goods or services related to the business transaction; and
   creating, by the processing apparatus, a confirmed-delivery data object for use in documenting receipt of at least some of the goods or services by a product recipient,
   wherein the planning-delivery data object, the shipping-delivery data object, and the confirmed-delivery data object correspond to one another.

2. The storage device of claim 1 wherein the planning-delivery data object includes attributes identifying the goods or services to be provided through the business transaction.

3. The storage device of claim 1 wherein the shipping-delivery data object includes attributes identifying goods shipped from a logistics location to the product recipient, wherein the attributes include a product-identifier attribute and a product-quantity attribute.

4. The storage device of claim 3 wherein the shipping-delivery data object includes an attribute identifying materials used to ship at least some of the goods from the logistics location to the product recipient.

5. The storage device of claim 1 wherein the confirmed-delivery data object includes attributes identifying goods received by the product recipient, wherein the attributes include a product-identifier attribute and a product-quantity attribute.

6. The computer program product storage device of claim 1 wherein:
at least one attribute of the shipping-delivery data object is the same attribute of at least one attribute of the confirmed-delivery data object, and
a data value of the at least one of the attributes of the shipping-delivery data object is different from the data value of the at least one attribute of the confirmed-delivery data object.

7. The storage device of claim 1 wherein:
the business transaction involves outbound delivery of goods from a logistics location to the product recipient, and
the planning-delivery data object, the shipping-delivery data object, and the confirmed-delivery data object document aspects of shipment of the goods from the logistics location to the product recipient.

8. The storage device of claim 1 wherein:
the business transaction involves inbound delivery of goods from a product supplier to a logistics location, and
the planning-delivery data object, the shipping-delivery data object, and the confirmed-delivery data object document aspects of shipment of the goods from the product supplier to the logistics location.

9. A computer-implemented method for managing a supply chain for a business enterprise in a manner that is applicable to many different business enterprises, the method comprising:
creating, by a processing apparatus, a planning-delivery data object for use in documenting planned delivery of goods or services related to a business transaction;
creating, by the processing apparatus, a shipping-delivery data object for use in documenting shipment of at least some of the goods or services related to the business transaction; and
creating, by the processing apparatus, a confirmed-delivery data object for use in documenting receipt of at least some of the goods or services by a product recipient,
wherein the planning-delivery data object, the shipping-delivery data object, and the confirmed-delivery data object correspond to one another.

10. The method of claim 9 wherein the planning-delivery data object includes attributes identifying the goods or services to be provided through the business transaction.

11. The method of claim 9 wherein the shipping-delivery data object includes attributes identifying goods shipped from a logistics location to the product recipient, wherein the attributes include a product-identifier attribute and a product-quantity attribute.

12. The method of claim 11 wherein the shipping-delivery data object includes an attribute identifying materials used to ship at least some of the goods from the logistics location to the product recipient.

13. The method of claim 9 wherein the confirmed-delivery data object includes attributes identifying goods received by the product recipient, wherein the attributes include a product-identifier attribute and a product-quantity attribute.

14. The method of claim 9 wherein:
at least one attribute of the shipping-delivery data object is the same attribute of at least one attribute of the confirmed-delivery data object, and
a data value of the at least one of the attributes of the shipping-delivery data object is different from the data value of the at least one attribute of the confirmed-delivery data object.

15. The method of claim 9 wherein:
the business transaction involves outbound delivery of goods from a logistics location to the product recipient, and
the planning-delivery data object, the shipping-delivery data object, and the confirmed-delivery data object document aspects of shipment of the goods from the logistics location to the product recipient.

16. The method of claim 9 wherein:
the business transaction involves inbound delivery of goods from a product supplier to a logistics location, and
the planning-delivery data object, the shipping-delivery data object, and the confirmed-delivery data object document aspects of shipment of the goods from the product supplier to the logistics location.

17. A system for managing a supply chain for a business enterprise in a manner that is applicable to many different business enterprises, the apparatus comprising:
a processing apparatus to (i) create a planning-delivery data object for use in documenting planned delivery of goods or services related to a business transaction, (ii) create a shipping-delivery data object for use in documenting shipment of at least some of the goods or services related to the business transaction; and (iii) create a confirmed-delivery data object for use in documenting receipt of at least some of the goods or services by a product recipient,
wherein the planning-delivery data object, the shipping-delivery data object, and the confirmed-delivery data object correspond to one another.

18. Apparatus for use in managing a supply chain for a business enterprise in a manner that is applicable to many different business enterprises, the apparatus comprising a memory, the memory comprising instructions that, when executed by a processing apparatus, result in operations comprising:
creating, by the processing apparatus, a planning-delivery data object for use in documenting planned delivery of goods or services related to a business transaction;
creating, by the processing apparatus, a shipping-delivery data object for use in documenting shipment of at least some of the goods or services related to the business transaction; and
creating, by the processing apparatus, a confirmed-delivery data object for use in documenting receipt of at least some of the goods or services by a product recipient,
wherein the planning-delivery data object, the shipping-delivery data object, and the confirmed-delivery data object correspond to one another.

* * * * *